(12) United States Patent
Marks et al.

(10) Patent No.: US 8,696,479 B2
(45) Date of Patent: Apr. 15, 2014

(54) OBSERVATION TOWER

(75) Inventors: David Marks, London (GB); Julia Barfield, London (GB)

(73) Assignee: Marks Barfield Limited, London (GB)

( * ) Notice: Subject to any disclaimer, the term of this patent is extended or adjusted under 35 U.S.C. 154(b) by 876 days.

(21) Appl. No.: 11/574,247

(22) PCT Filed: Jun. 8, 2005

(86) PCT No.: PCT/GB2005/002243
§ 371 (c)(1),
(2), (4) Date: Nov. 9, 2007

(87) PCT Pub. No.: WO2006/021735
PCT Pub. Date: Mar. 2, 2006

(65) Prior Publication Data
US 2008/0185224 A1    Aug. 7, 2008

(30) Foreign Application Priority Data
Aug. 24, 2004  (GB) .................................... 0418879.3

(51) Int. Cl.
*E04H 12/18*    (2006.01)
(52) U.S. Cl.
USPC .......................................... 472/131; 182/141

(58) Field of Classification Search
USPC ........................................... 182/141; 472/131
See application file for complete search history.

(56) References Cited

U.S. PATENT DOCUMENTS

| | | | |
|---|---|---|---|
| 3,633,904 A * | 1/1972 | Kojima | 472/2 |
| 4,712,652 A | 12/1987 | Smidek et al. | |
| 4,841,685 A * | 6/1989 | Masri et al. | 52/1 |
| 6,128,863 A * | 10/2000 | Millay | 52/65 |

FOREIGN PATENT DOCUMENTS

| | | |
|---|---|---|
| DE | 1 230 543 B | 12/1966 |
| FR | 2 698 896 A | 6/1994 |
| GB | 7 88 086 A | 12/1957 |

* cited by examiner

*Primary Examiner* — Michael Dennis
(74) *Attorney, Agent, or Firm* — Lowe Hauptman & Ham, LLP

(57) ABSTRACT

The present invention relates to an observation tower, particularly a tower having a moveable observation enclosure. An embodiment of the observation tower comprises an upright support member with an annular observation enclosure that projects radially outward from the support member and has a tapering aerodynamic exterior profile. The observation enclosure is moveable up and down the support member.

20 Claims, 4 Drawing Sheets

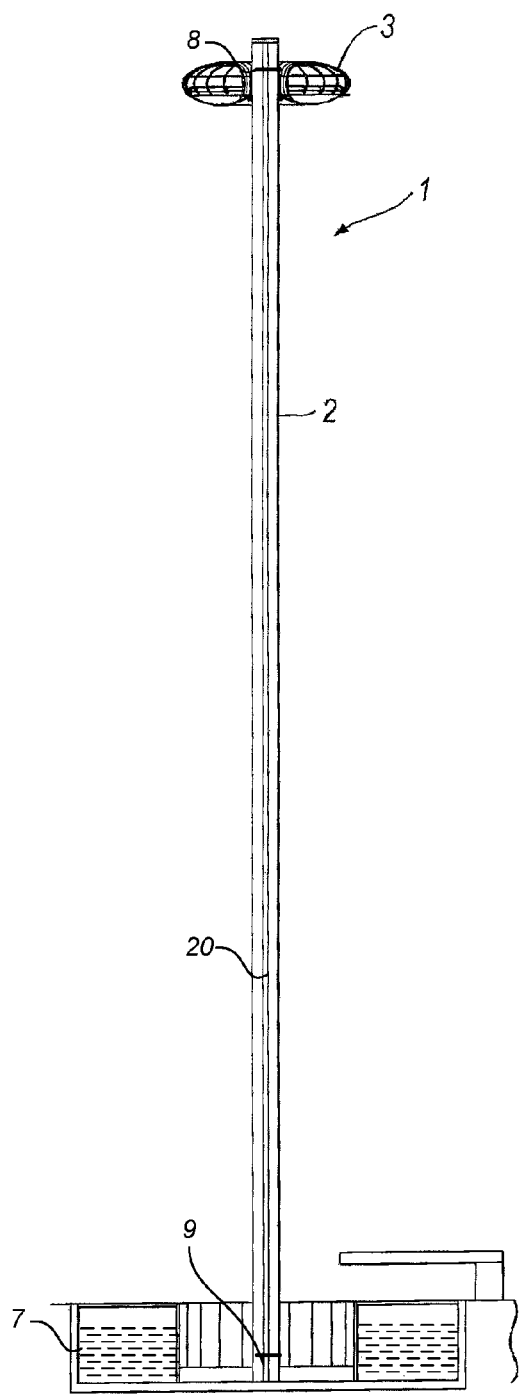
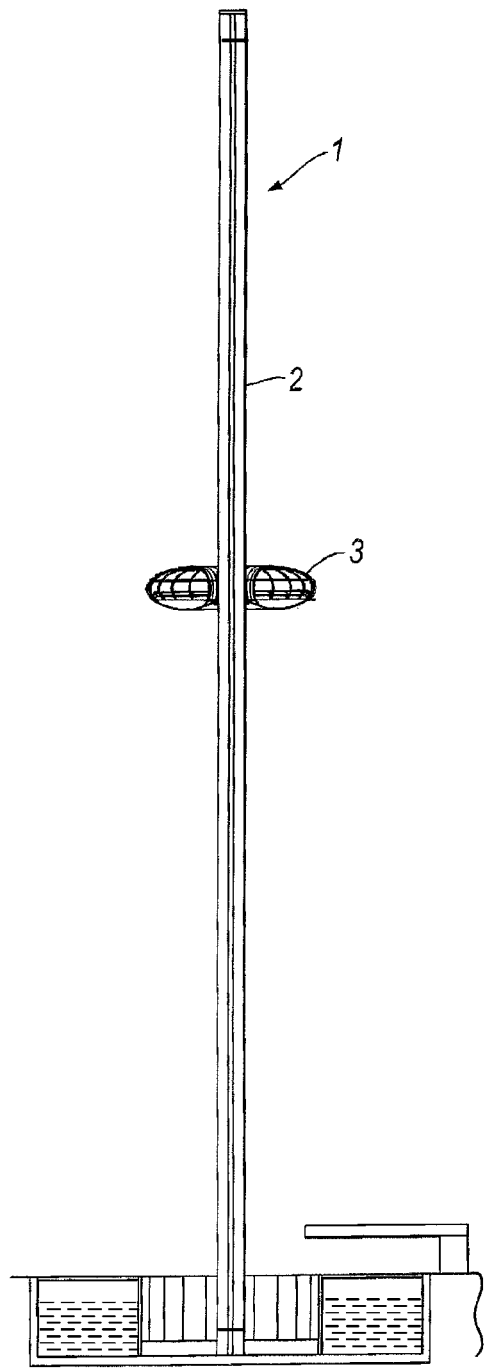
Fig. 1a
Fig. 1b

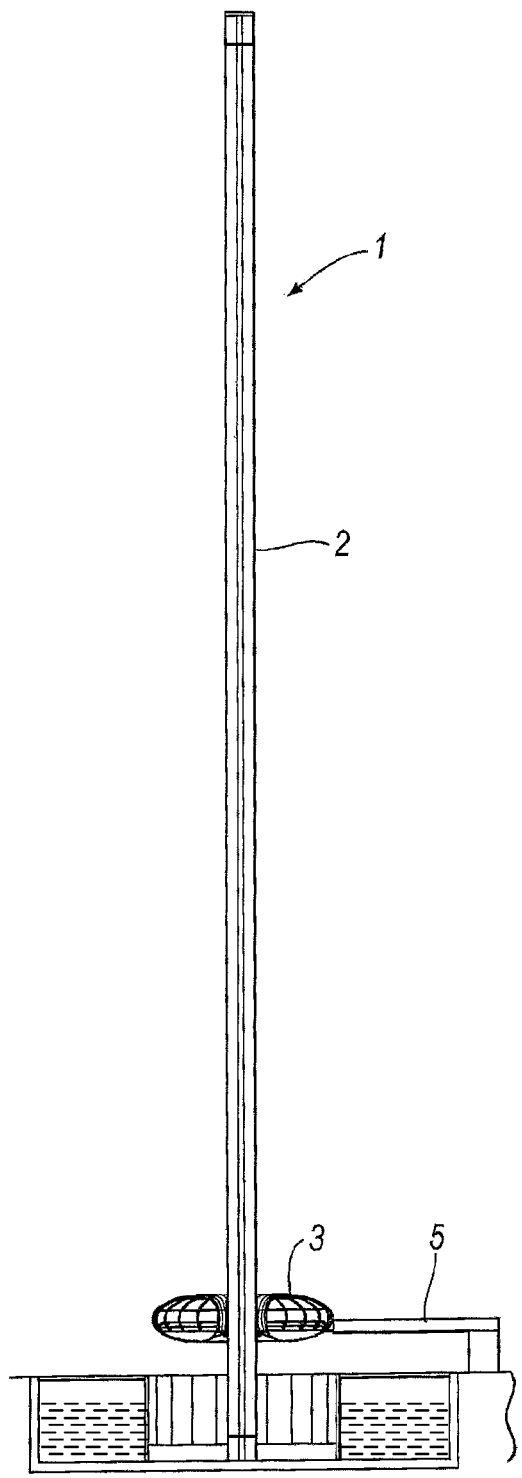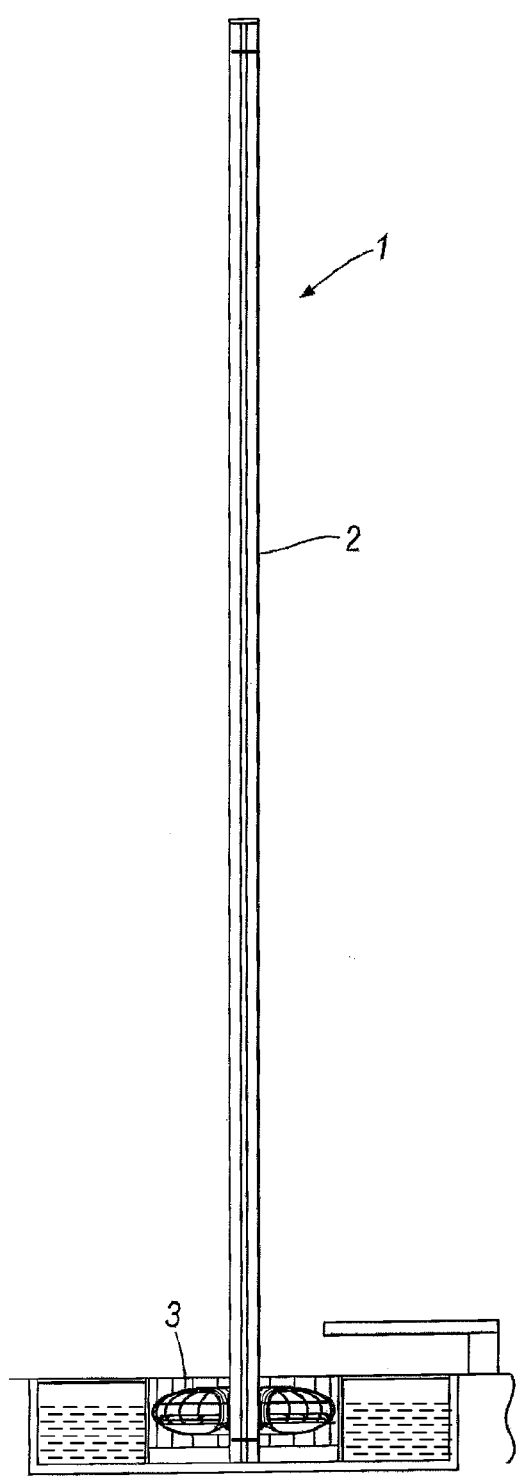

OBSERVATION TOWER

RELATED APPLICATIONS

The present Application is based on International Application No. PCT/GB2005/002243, filed on Jun. 8, 2005, which in turn corresponds to United Kingdom Application No. 04188793 filed on Aug. 24, 2004, and priority is hereby claimed under 35 USC §119 based on these applications. Each of these applications are hereby incorporated by reference in their entirety into the present application.

The present invention relates to an observation tower, in particular an observation tower having a moveable observation enclosure.

In this regard, observation towers of many types are known in the art. For example, observation towers of the sort disclosed in EP 1031681 and EP 0659959 are employed for sighting forest fires. Such towers can be rapidly constructed, provided with foot-ladders or a lift for transporting personnel to the top, and can also be made out of environment-friendly materials or disguised so as to blend in with the surrounding environment.

Observation towers may also be used as means for providing leisure and entertainment facilities. Examples include the "Tower of the Americas" in Texas, USA, the "Faro de Madrid" in Madrid, Spain and the "Skylon" near Niagara Falls in Ontario, Canada. Numerous similar towers exist around the world, however in these examples, the observation platform, which may include therein restaurants and shops, is fixed at a specific height. Lifts or stairs are therefore provided to transport visitors from ground level to the observation platform, usually within the internal tower shaft. Thus, visitors are confined to restricted views when ascending and descending the tower to and from the observation platform. Alternatively, transparent lifts can be provided on the outside of the tower shaft, as on the "Macau Tower" in Macau, Asia, however the above identified problems may still prevail, with the added disadvantage that external lifts may be unsightly and disrupt the aesthetic profile of the tower.

Further examples of tower structures, such as those disclosed in GB 655970 and EP 0337673 are provided with an observation platform mounted on a tower which itself is capable of ascending or descending. In both instances, the tower is capable of moving up and down, either by collapsing in on itself (e.g. using a so-called 'lazy tongs' system) or by sinking completely into the ground. The observation platform of these arrangements can thereby travel from a lower position to a higher position. In both examples, a large horizontal or vertical surface area is required at ground level. With the 'lazy tongs' system, a larger surface area will be required for increased heights, and with the latter example, the height of the tower must be accommodated below the surface of the ground. Restrictions with regard to locating the observation tower therefore apply with both examples of moveable tower.

Furthermore, the vertical movement of the tower shaft required to enable boarding and disembarking of the observation platform compromises its overall strength, thereby limiting its maximum height and making it more vulnerable in adverse weather conditions.

GB 1109555 and U.S. Pat. No. 3,633,904 disclose towers that comprise a fixed tower shaft provided with a moveable observation platform. In both instances, visitors board the observation platform when it is at ground level and enjoy the surrounding scenery as the observation platform ascends to its maximum height. Similar towers have been designed and manufactured by Huss Maschinenfabrik GmbH & Co. GK and Intamin Deutschland GmbH & Co. GK, for example the Skytower and Gyro Tower, respectively. The aforementioned towers are limited by their height and the speed at which the observation platforms may ascend, and because of their profiles are susceptible to lateral movement during adverse weather conditions. As previously indicated, safety of the passengers and crew is likely to be compromised in such conditions and the tower will have to be removed from operation until such time as conditions improve.

Furthermore, the shape of the observation platform disclosed in GB 1109555 provides only restricted panoramic visibility, and the shape of the observation platform disclosed in U.S. Pat. No. 3,633,904 prevents visitors from assuming a normal vertical position when seated or standing, thereby diminishing their comfort. Functionality of the tower is hence restricted as a result of the observation platform's shape and angled orientation.

It is hence an object of the present invention to provide an observation tower that seeks to overcome the above identified disadvantages.

According to an aspect of the present invention, there is provided an observation tower comprising: a substantially upright support member; and an annular observation enclosure moveable up and down said support member; wherein the observation enclosure projects radially outwardly from and substantially normal to said support member and presents a tapering aerodynamic exterior profile around its circumference.

The observation enclosure of the observation tower may in this respect have a toroid profile. As such, the curved sides of the observation enclosure allow air currents to flow easily over and around the enclosure to thereby reduce the amount of lift or drag that is applied thereto. Less resistance is thus exerted on the observation enclosure by air currents when, for example, it is moving up or down the supporting member of the observation tower. Also, the tower is less vulnerable to high speed winds and as a result, the observation enclosure is capable of ascending to heights of up to 200 metres. Increased control can be exerted over the speed at which the observation enclosure is movable, the speed being variable if and when necessary.

In particularly adverse weather conditions the height of the observation enclosure can be reduced to decrease lateral deflection of the tower caused by wind pressure. This will enable the tower to remain in operation during strong winds while maintaining safety and comfort for both visitors and crew.

Conveniently, the substantially upright support member has a first portion arranged substantially above ground level and a second portion arranged substantially below ground level. In this regard, the observation enclosure may be lowered below ground level for gaining access to, or visibility of, an underground attraction or enclosure.

According to another aspect of the present invention, there is provided an observation tower comprising: a substantially upright support member provided with a first portion arranged substantially above ground level and a second portion arranged substantially below ground level; and an observation enclosure moveable up and down said support member.

A boarding level may be provided between said first and second portions of the support member for boarding said observation enclosure; wherein the observation enclosure is moveable up or down relative to said boarding level.

Preferably, a sunken enclosure is provided around said second portion of the support member and may be arranged to house the observation enclosure when the observation enclosure is provided at the second portion of the support member.

An outer surface of the sunken enclosure may comprises substantially transparent material.

Damping apparatus 8 may be provided as part of the observation tower for damping undesirable vibrations of the tower. The damping apparatus 8 may in this regard comprise a mass spring damper, tunable to enable its damping characteristics to be varied in accordance with the height of the enclosure relative to the upright support member. In this way, undesirable vibrations in the support member due to adverse weather conditions can be dampened. The damping apparatus may be movable within the support for tuning purposes.

Such a damping apparatus is preferably incorporated into the upright support member. Conveniently the damping apparatus is incorporated within a top portion of the support member.

Examples of the present invention will now be described with reference to the accompanying drawings, in which: —

FIGS. 1a, 1b, 1c and 1d show an observation tower according to the present invention with an enclosure at different height positions;

Figure 2:
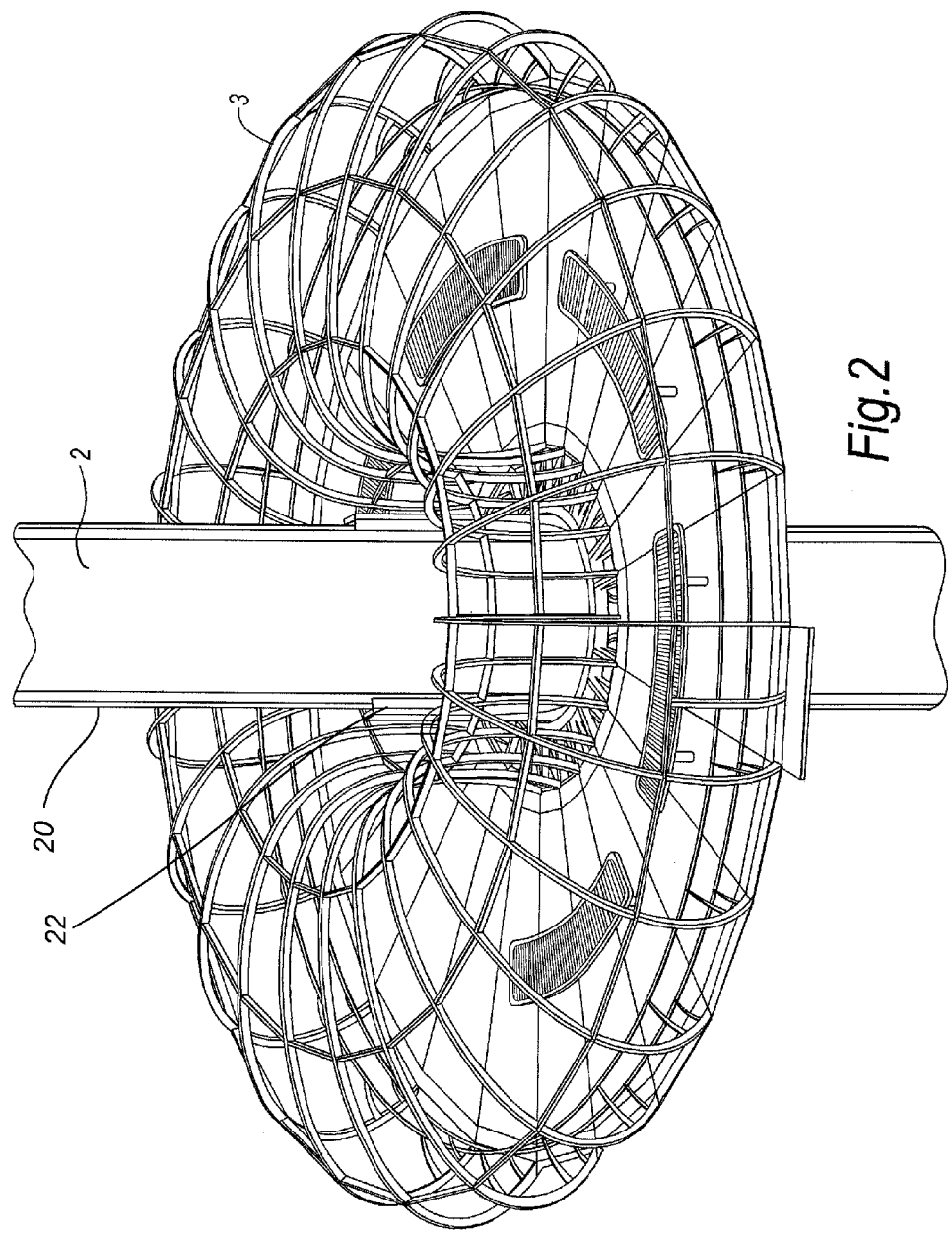
FIG. 2 shows a close up perspective view of the enclosure of the present invention.
Figure 3:
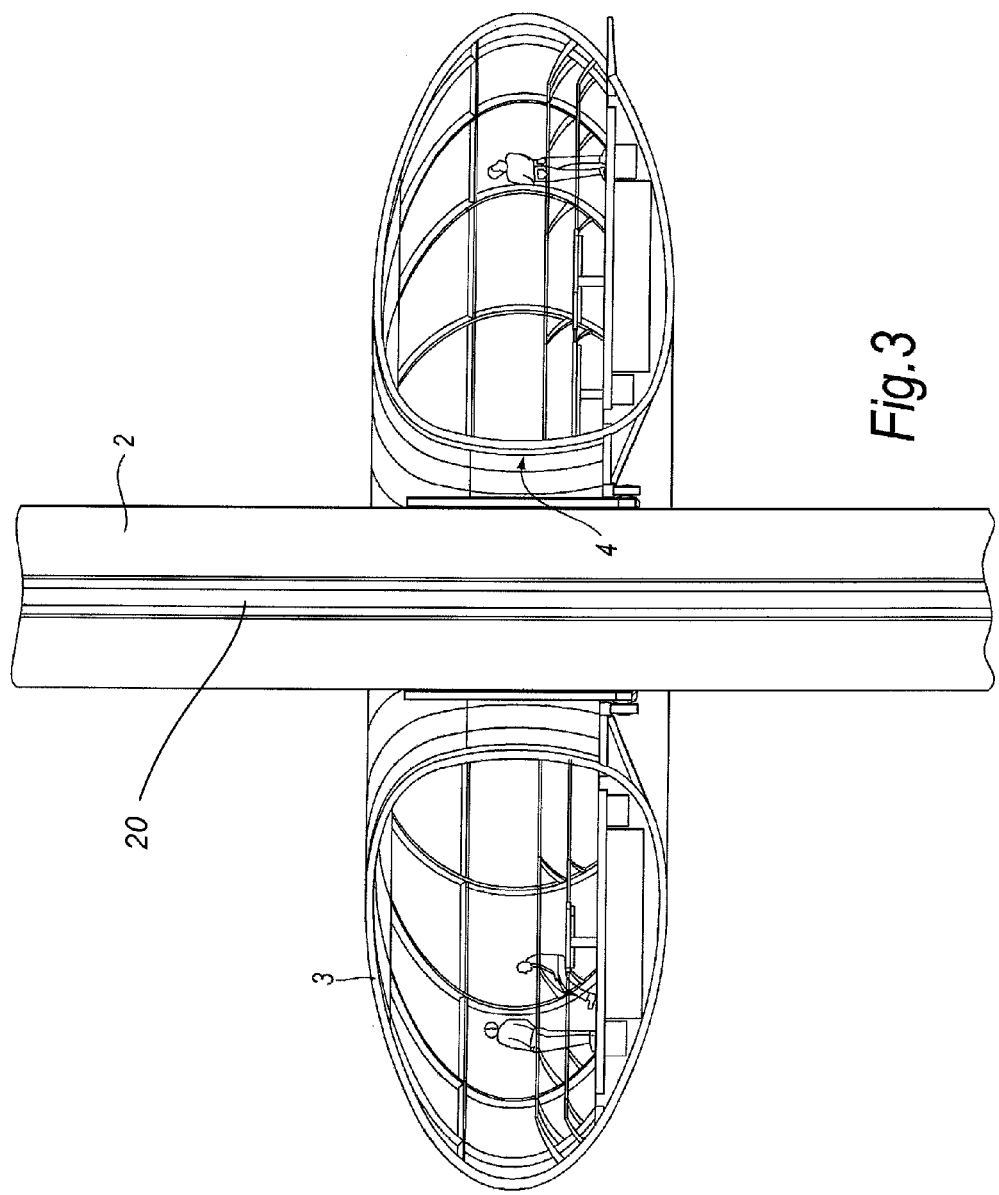
FIG. 3 shows a cross-sectional view through the enclosure of the present invention.

As shown in the figures, a tower 1 comprises a substantially upright support member 2 and an annular observation enclosure 3. The support member 2 is positioned at the center of the annular observation enclosure 3. In some embodiments, the upright support member 2 has one or more guide rails 20 formed thereon, and the observation enclosure 3 has at least one runner (e.g., a clamping device) 22 corresponding to the one or more guide rails 20. The runner 22 and the corresponding guide rail 20 allow the observation enclosure 3 moveable up and down along said support member 2.

The observation enclosure 3 projects radially outwardly from and substantially normal to said support member 2 and as shown presents a tapering aerodynamic exterior profile around its circumference.

In the preferred example shown, the observation enclosure has an annular profile, in particular a toroid exterior profile. As such, the curved sides of the observation enclosure allow air currents to flow easily over and around the enclosure to thereby reduce the amount of lift and/or drag that is applied thereto. Less wind pressure is thus exerted on the observation enclosure by air currents when stationery or, for example, when it is moving up or down the supporting member of the observation tower. The aerodynamic profile of the enclosure means therefore that it is less vulnerable to the affects of high winds, such that the enclosure will be stable at higher positions.

Damping apparatus (not shown) may be provided as part of the observation tower for damping undesirable vibrations of the tower. The damping apparatus may in this regard comprise a mass spring damper, tunable to enable its damping characteristics to be varied in accordance with the height of the enclosure relative to the upright support member. In this way, undesirable vibrations in the support member due to adverse weather conditions can be dampened. The damping apparatus may be movable within the support for tuning purposes.

Such a damping apparatus is preferably incorporated within the upright support member at a top portion thereof.

An annular flow path may be provided through the centre of the enclosure between an inwardly facing wall 4 thereof and the support member 2 as shown in FIG. 2.

The enclosure is preferably sized to house around 70-100 persons, offering them a 360-degree panoramic walk-around experience. It can be air-conditioned with climate-control to ensure comfort is optimised. A retractable solar shading arrangement may be provided to cover the roof of the enclosure when required.

The enclosure may be constructed of steel and glass, preferably using curved laminated safety glass.

As shown in FIGS. 1a to 1d, the enclosure is movable up and down the support member 2 and can dock at an alighting platform position 5 and also move to an underground position, shown in FIG. 1d.

The underground position can provide shelter from particularly adverse weather conditions or may provide access to a particular or restricted access area.

In at least one embodiment, a sunken enclosure 7 is provided around said second portion of the support member and may be arranged to house the observation enclosure when the observation enclosure is provided at the second portion of the support member. An outer surface of the sunken enclosure 7 may comprise substantially transparent material.

For example, the underground area may incorporate an underground aquarium, whereby the enclosure drops into an annular tank housing various aquatic plants and creatures. Horizontally translating off-set hinged glazed doors may afford access to the enclosure.

The support member may be formed for example, from 3.4 m diameter grade 43 galvanised steel. A machine room 9 is provided at a lower portion of the support member.

Renewable energy is utilized to power the observation tower and this may take the form of photovoltaic systems or wind turbines.

The invention claimed is:

1. An observation tower comprising:
   a substantially upright support member;
   a damping apparatus positioned on the support member and arranged for damping vibrations of the tower; and
   an observation enclosure
      moveable up and down along said support member and not annularly movable with respect to the support member;
   wherein the observation enclosure projects radially outwardly from and substantially normal to said support member, the observation enclosure is annular and has a toroid profile with a tapering aerodynamic exterior profile around its circumference, the observation enclosure further being sized to accommodate 70-100 passengers to walk around therewithin during a period that the observation enclosure moves up or down, thereby the passengers are able to have a 360 degree panoramic walk-around experience.

2. The observation tower according to claim 1, wherein the tower has a height of up to 200 meters.

3. The observation tower according to claim 1, wherein the observation enclosure is moveable at variable speeds.

4. The observation tower according to claim 1, wherein the support member comprising:
   a first portion arranged substantially above a ground level; and
   a second portion arranged substantially below ground level.

5. The observation tower as claimed in claim 4, further comprising a boarding level provided between said first and second portions of the support member for boarding said observation enclosure; wherein the observation enclosure is moveable up or down relative to said boarding level.

6. The observation tower according to claim 4, wherein a sunken enclosure is provided around said second portion of the support member.

7. An observation tower according to claim 6, wherein said sunken enclosure is arranged to house the observation enclosure when the observation enclosure is provided at the second portion of the support member.

8. The observation tower according to claim 6, wherein the sunken enclosure contains an aqueous environment.

9. The observation tower according to claim 1, wherein the observation enclosure comprises substantially transparent material.

10. The observation tower according to claim 1, wherein renewable energy is utilized to power the observation tower.

11. The observation tower according to claim 10, wherein said renewable energy comprises photovoltaic systems or wind turbines.

12. The observation tower according to claim 1, wherein a machine room is provided at a lower portion of the support member.

13. The observation tower according to claim 1 wherein the damping apparatus comprises a mass spring damper, tunable to vary its damping characteristics in accordance with the height of the enclosure relative to the upright support member.

14. The observation tower according to claim 1, wherein the damping apparatus is incorporated within an upper portion of the upright support member.

15. The observation tower according to claim 2, wherein the observation enclosure is moveable at variable speeds.

16. The observation tower according to claim 5, wherein a sunken enclosure is provided around said second portion of the support member.

17. The observation tower according to claim 16, wherein the sunken enclosure contains an aqueous environment.

18. The observation tower according to claim 13, wherein the damping apparatus is incorporated within an upper portion of the upright support member.

19. The observation tower according to claim 1, wherein the observation enclosure is substantially free of seating.

20. An observation tower comprising:
a substantially upright support member;
at least one guide rail formed on the support member; and
an observation enclosure comprising:
at least one runner corresponding to the at least one guide rail, the at least one runner and the corresponding guide rail are configured to limit intentional movement of the observation enclosure to up and down movement along said support member,
wherein the observation enclosure projects radially outwardly from and substantially normal to said support member, the observation enclosure is annular and has a toroid profile with a tapering aerodynamic exterior profile around its circumference, the observation enclosure further being sized to accommodate 70-100 and configured to enable passengers to walk around 360 degrees of the observation enclosure.

* * * * *